Aug. 4, 1942.  L. R. HARMON  2,291,895
FLASHER WITH PILOT LIGHT CONTROL
Filed Jan. 13, 1940  2 Sheets-Sheet 1
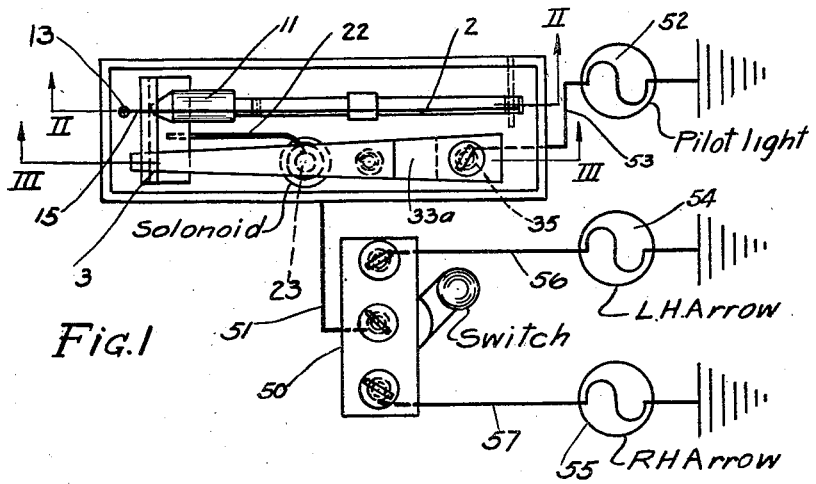
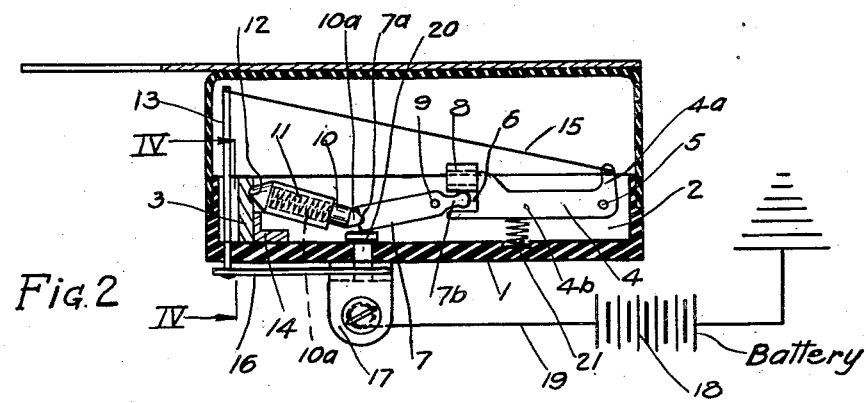
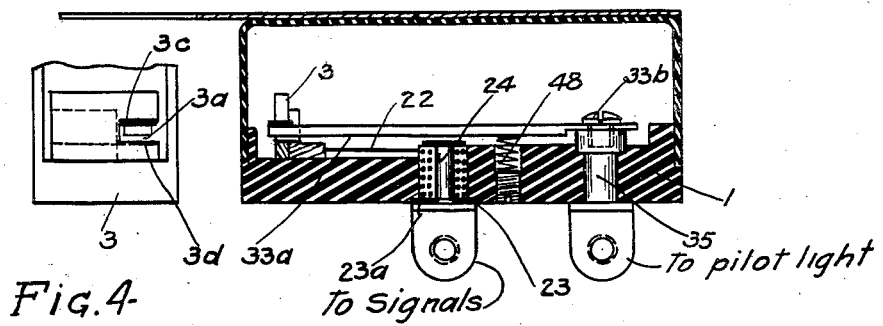
INVENTOR.
Luther R. Harmon
BY Edward N. Weinert
ATTORNEY.

Aug. 4, 1942.    L. R. HARMON    2,291,895
FLASHER WITH PILOT LIGHT CONTROL
Filed Jan. 13, 1940    2 Sheets-Sheet 2

INVENTOR.
Luther R. Harmon
BY Edward N. Weinert
ATTORNEY.

Patented Aug. 4, 1942

2,291,895

UNITED STATES PATENT OFFICE 2,291,895

FLASHER WITH PILOT LIGHT CONTROL

Luther R. Harmon, Chicago, Ill.

Application January 13, 1940, Serial No. 313,657

10 Claims. (Cl. 175—373)

This invention relates to a flasher embodying a pilot light control that will indicate to the operator whether the signals are effective.

When flashers are used upon motor vehicles for controlling signals such as directional signals or lights, it is desirable for the operator to know whether such signals or lights are functioning. According to this invention one or more pilot lights are provided and are controlled in a novel manner by the flasher and signal circuit so as to be illuminated when the signal or signals are functioning and to be out when the signal or signals are not functioning.

The invention comprises the novel structure and combination of parts hereinafter described and more particularly pointed out in the appended claims.

In the accompanying drawings which illustrate a preferred form of this invention and in which similar reference characters refer to similar features in the different views:

Fig. 1 is a top plan view of a flashing mechanism involving this invention showing parts in diagrammatic form with the casing removed.

Fig. 2 is a sectional view taken substantially upon the line II—II of Fig. 1.

Fig. 3 is a sectional view taken upon the line III—III of Fig. 1, looking in the direction of the arrows.

Fig. 4 is an enlarged sectional view taken upon the line IV—IV of Fig. 2.

Figure 5:
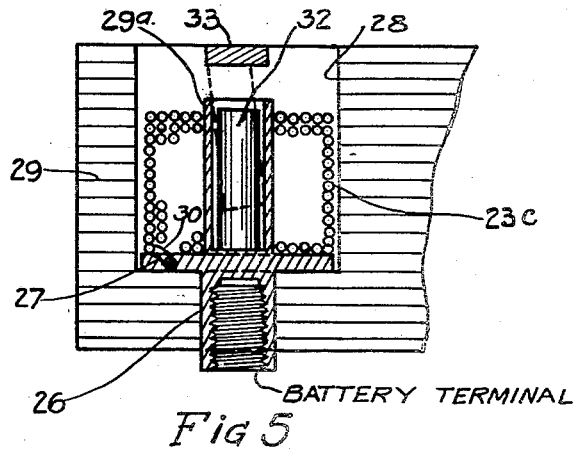
Fig. 5 is a sectional view of a modified form of the invention.

In the drawings, there is shown a flasher mechanism substantially similar to the one set forth in my co-pending application, Serial No. 286,085 filed July 24, 1939, now Patent No. 2,252,003 of August 12, 1941.

The flasher comprises a base which may be made of Bakelite or the like. A longitudinal groove 2 is formed in the base adjacent one side margin. A conductor rod 13 is fastened in the base forward of the groove and extends upwardly and a short distance below the base.

Within the groove 2 there is pivoted a lever 4 which is in the form of a bell crank having an upstanding short arm 4a and a longitudinally extending arm 4b. This lever is pivoted to the base at the apex of the arm as indicated at 5. The forward end of the lever 4 is bifurcated as indicated at 6 and the tail 7b of a second lever 7 extends into said bifurcation. A band or ring 8 of insulation encompasses the upper jaw of the bifurcation. The lever 7 is pivoted to the base at 9 just forward of the tail arm which is reduced to loosely engage in the bifurcation. The forward end of the lever 7 is articulated to the rear end of a plunger 10. While the lever 7 and plunger 10 may be articulated in any suitable manner, in the present instance, the free end of the lever 7 is provided with a socket 7a; the plunger 10 being provided with a tapering end 10a seated in said socket.

The plunger 10 slidably extends into a tubular member 11 having its far end closed and pointed and pivoted in a cavity or recess 12 in a plate 3 rising from the base to which it may be suitably fastened by an angle 14 or the like. The part of the plunger 10 that is within the member is cup-shaped and a coil spring 10a is seated in the cup shaped portion of the plunger and bears against the bottom or closed end of the tubular member 11.

A thermo-responsive resistance wire 15 is connected at one end to the arm 4a of the lever 4. The other end of the wire 14 is attached to the upper end of the rod 13. The lower end of the rod 13 is connected by a wire 16 to the battery post 17 to which a battery 18 is connected by a wire 19. The post 17 extends through the base and has a contact 20 upon its upper end just below the articulation of the levers 7 and 10. The lever 4 which actuates lever 7 is actuated by a spring 21 therebelow when the resistance wire 15 becomes elongated.

When the resistance wire 15 is contracted, lever 4 will be in its lowered position and the spring 21 bearing upward against the lever 7 will be compressed, and the articulated levers 7 and 10—11 will be in the upper positions. However, when the resistance wire 15 elongates through heating thereof, spring 21 will elevate lever 4 and move the articulated levers 7—11 downwardly and just beyond dead center they will snap down against contact 20 as shown in Fig. 2. In this position, the current will pass directly through contact 20, lever 7, plunger 10 and plate 3. From plate 3, the current passes through wire 22 (Fig. 1) to a solenoid 23. For it will be noted that in this position, the end 7b of lever 7 engages insulation 8 and breaks the resistance circuit, preventing current from passing through resistance wire 15.

It is desirable to know that the signals are functioning and for this purpose a pilot light is put in circuit when the signals are functioning. To accomplish this, the solenoid 23 is utilized to close a circuit to a pilot light when the circuit to the signals is established. However, when the current passes through the resistance wire 15, the solenoid does not possess the necessary energy to establish the pilot light circuit.

With reference to Fig. 3, it will be noted that the solenoid 23 has been secured in a suitable recess in the base. The solenoid has a rigid and stationary core 24 and the coil of the core is connected to a terminal post 25 as indicated at 23a.

However, instead of a solenoid with a stationary core, a solenoid with a movable core may be used as shown in Fig. 5. Thus, the terminal post 25 may be connected to a sleeve 26 having a plate 27 located in the bottom of a socket 28 formed in the insulated base. A central sleeve 29a rises from the plate 27, and the solenoid coil 23c is wound around the sleeve 29a in which a movable core 32 is positioned. When the solenoid is sufficiently energized the core 32 will jump outwardly and tilt against the sleeve 29a for effecting an electrical connection and contact a bridging conductor 33 for establishing a circuit to the pilot light.

However, in the preferred form of the invention, the bridging conductor 33a that corresponds to the conductor 33 is secured at one end by means of a fastener 33b to the top of the base, which fastener is in contact with the pilot light post 35. The switch conductor 33a extends over the solenoid 23 and into a cut out portion 3a in plate 3 (Fig. 4). The upper wall of the cut out portion or recess 3a is insulated as indicated at 3c while the bottom forms a contact for the switch lever 33a.

To normally elevate the conductor 33a, a spring 48 is positioned in the base beneath the conductor. The solenoid is adapted to attract the member 33a and bring the same into engagement with the contact formed by the lower wall of the cut-out in plate 3 to establish a circuit through switch conductor 33a and post 35 to the pilot light.

The coil of solenoid 23 is shown as connected to a two way switch 50 by a conductor 51 while the pilot light post 35 is connected to a pilot light 52 by a conductor 53. The switch 50 is connected to the left hand and right hand signals 54 and 55 respectively by conductors 56 and 57.

Figure 6:
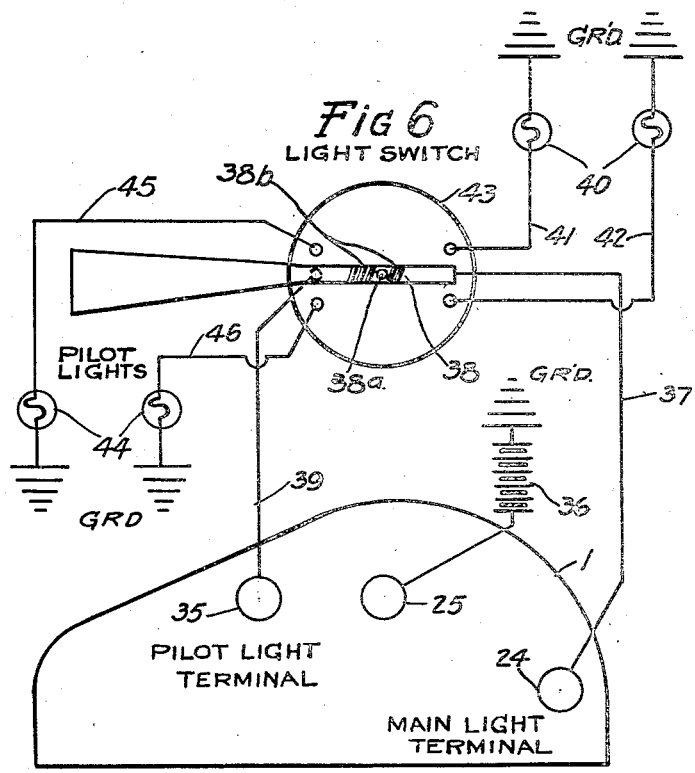
Fig. 6 is a diagrammatic view illustrating a system with two pilot lights.

In Fig. 6 there is illustrated a wiring diagram showing the arrangement for a two pilot light system. The battery 36 is connected to the terminal post 25. A wire 37 leads from the post 25 to a switch 38 and a wire 39 leads from the pilot light terminal post 35 to the switch 38.

The signals are represented by the references 40 and are suitably grounded and connected by wires 41 and 42 to a disc 43 to which switch lever 38 is pivoted as indicated at 38a at which point the lever is insulated as indicated at 38b. The pilot lights 44 which are also suitably grounded are respectively connected by wires 45 and 46 to the disc 43.

It will be noted that the switch lever 38 extends between the pilot light posts on disc 43 and between the signal posts upon disc 43 which are suitably spaced so that as the lever is swung in one direction, one pilot light and one signal light will be placed in operation and when it is swung in the other direction, the other pilot light and signal will become operative.

When a signal is properly functioning, the solenoid will of course establish a current through post 35, wire 39 to switch lever 38 and either wire 45 or 46 depending upon which one is in contact with the switch lever for illuminating a pilot light.

In use, the preferred form of apparatus operates as follows: Normally the thermo-resistance wire 15 maintains the electric conducting levers 7—10 in elevated position. When the battery 18 is turned on, the current will pass through post 17, wire 16, post 13, wire 15, levers 4, 7 and 10—11, to plate 3; from plate 3 through wire 22 and solenoid 23 to signal switch 50, but this current due to the resistance of wire 15 is too weak to attract the pilot light switch element 33a. However, when the wire 15 elongates, spring 21 will become effective for tilting conducting lever 4 in an upward direction and causing the articulated levers 7, 10—11 to move downwardly to just below dead center when the same will snap down into engagement with contact 20 and post 17.

With the articulated conducting levers in contact with contact 20, the current from battery 18 passes through post 17, contact 20 and levers 7—10—11 to plate 3 and from plate 3 through wire 22, solenoid 23 to signal switch 50. The current will now be strong enough in the solenoid to attract pilot switch member 33a against contact 3d for establishing a circuit from the plate 3 through switch 33a to the pilot light post 35 and to the pilot light.

When a solenoid with a movable core as shown in Fig. 5 is used, the pilot light switch element 33 will extend only over the core of the solenoid; the connection with the plate 3 being omitted.

From the foregoing, it will be appreciated that a novel flashing mechanism has been provided that indicates when the same is properly functioning; that is simple and sure in action, and that positively differentiates between its intermittent flashing actions.

I am aware that many changes may be made and various details of construction may be varied without departing from the principles of this invention and I do not propose limiting the patent granted thereon otherwise than necessitated by the prior art and appended claims.

I claim as my invention:

1. In a thermal flasher, an insulated base, a contact on said base, a current carrying snap switch for intermittently engaging said contact, a current conducting lever having a bifurcated end engaging an end of said snap switch, one jaw member of said bifurcation being insulated and the other being adapted for forming a contact with said snap switch, a current conducting rod extending from said base, a resistance wire connecting said rod and lever and effective through expansion and contraction for controlling said lever.

2. In a thermal flasher comprising a resistance circuit, a current carrying snap switch in said circuit comprising a pair of end to end articulated members, a current conducting lever having a bifurcated end forming spaced jaw elements loosely receiving an end of one of said members for initiating movement of said snap switch, one of said jaw elements being insulated, a flashing circuit having a contact in operative relation with said snap switch and adapted to be intermittently engaged thereby, said insulated jaw element serving to interrupt the resistance circuit when said flashing circuit is established.

3. In a thermal flasher, an insulated base, a contact post extending through said base and having a contact above said base, a snap switch comprising a pair of end to end articulated members mounted upon said base, a lever pivoted upon said base and having a bifurcated end forming spaced jaw elements loosely receiving an end of one of said members, one of said jaw elements being insulated, a conducting rod rising from said base and having an electrical connection with said post, and a resistance wire connecting said rod and lever and effective by expansion and contraction for controlling the movements of said lever, said lever and snap switch forming part of a resistance circuit when the latter is disengaged from said contact and a portion of said snap switch forming part of a flashing circuit when engaged with said contact.

4. In a thermal flasher, an insulated base, a contact post extending through said base, a snap switch comprising a pair of end to end articulated members mounted upon said base and adapted for making and breaking a circuit through said contact post, a conducting lever pivoted upon said base and having a bifurcated end engaging an end of one of said members for initiating the movement of said snap switch, said bifurcation having one wall insulated, a conducting rod extending above said base, and having a connection with said post, and a resistance wire connecting said rod and lever for controlling the movements of said lever and snap switch by expansion and contraction, said lever and snap switch forming part of a resistance circuit when the latter is disengaged from said contact post and said snap switch forming part of the flashing circuit when in contact with said post, said insulation being effective for preventing passage of current through said lever when said switch is in engagement with said contact post.

5. In a thermal flasher for signalling systems, a stationary contact, a current carrying snap switch comprising a pair of end to end articulated members adapted when in one position to complete a circuit through said contact and when in another position to break the circuit through said contact and forming part of a resistance circuit, a conducting lever having a bifurcated end forming jaw members for receiving an end of one of said members for initiating the movement of said snap switch, one of said jaw members being insulated, a conducting rod connected to a source of energy extending above said base and a resistance wire connecting said rod and free end of said lever and controlling the movements thereof by contraction and expansion.

6. In a thermal flasher, a base of insulating material, said base having a longitudinally extending groove, a conducting plate in said base adjacent one end of said groove, a current carrying snap switch member pivoted upon said plate and located in said groove, a second snap switch member pivoted in said groove and having one end articulated to the free end of said other member, one of said members comprising a pair of spring pressed relatively slidable telescopic elements, a contact engageable by one of said members, a conducting lever pivoted in said groove beyond said second member and having a bifurcated end receiving the free end of said second snap switch member, one wall of said bifurcation being insulated, a conducting rod rising from said base, a resistance wire connecting said rod and lever and effective upon contraction to move said lever in one direction for initiating the movement of said snap switch members in one direction and yielding means for moving said lever in the other direction for initiating the movement of said snap switch members in a direction opposite to the first movement, said plate, members and lever constituting part of an electrical circuit.

7. In a thermal flasher, a flashing circuit, means including a resistance circuit for intermittently establishing and disestablishing said flashing circuit, a solenoid in both circuits and means for indicating the establishment of said flashing circuit including an element unresponsive to said solenoid when said resistance circuit is active but responsive to said solenoid when said flashing circuit is established.

8. In a thermal flasher, a flashing circuit, a resistance circuit, means including said resistance circuit for intermittently establishing said flashing circuit and means for disestablishing said resistance circuit when said flashing circuit is established, a solenoid in both circuits and means for indicating the establishment of said flashing circuit including an element unresponsive to said solenoid when said resistance circuit is alive, but responsive to said solenoid when said flashing circuit is active.

9. In a flasher, an insulated base, a solenoid in said base, a thermal resistance circuit supported upon said base including a connection to said solenoid, a snap switch on said base and comprising a part of said resistance circuit, a flashing circuit comprising a portion of said snap switch and also said connection to said solenoid, a pilot light terminal on said base, said snap switch embodying means for breaking said resistance circuit and establishing said flashing circuit and means unresponsive to said solenoid when said resistance circuit is on but responsive thereto when the flashing circuit is established for establishing a circuit thru said pilot light terminal.

10. In a flasher, an insulated base, a resistance circuit on said base, a flashing circuit, a solenoid on said base and comprising a part of each circuit, a snap switch in said resistance circuit and partly in said flashing circuit and having means for breaking one circuit and establishing the other, a pilot light terminal on said base and means unresponsive to said solenoid when said resistance circuit is on but responsive thereto when said flashing circuit is on for establishing a circuit to said pilot light terminal.

LUTHER R. HARMON.